Feb. 10, 1970 M. LANNING 3,494,436
STORAGE VESSEL WITH SELF-CONTAINED WEIGHING APPARATUS
Filed Feb. 13, 1968
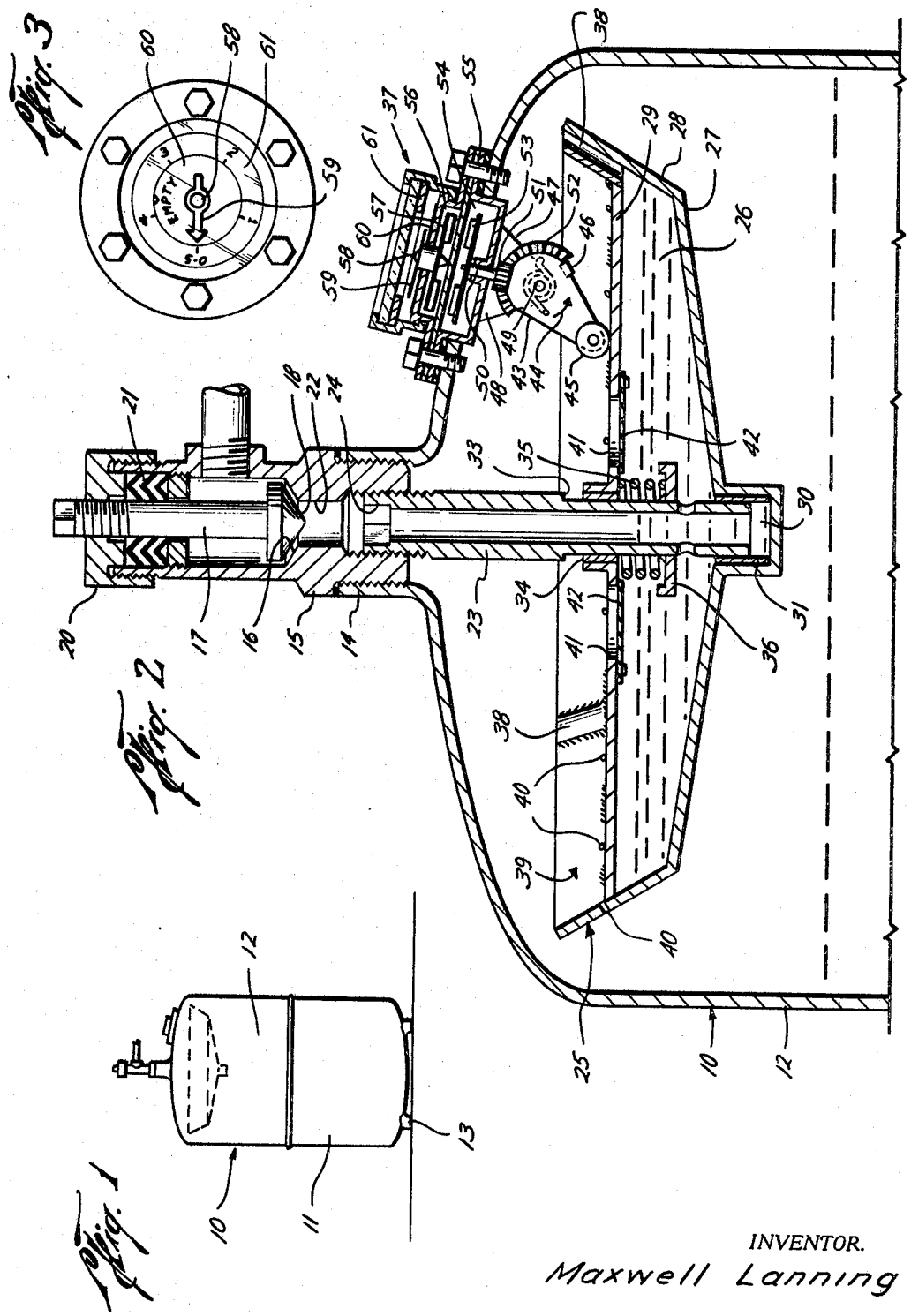
INVENTOR.
Maxwell Lanning

United States Patent Office 3,494,436
Patented Feb. 10, 1970

3,494,436
STORAGE VESSEL WITH SELF-CONTAINED
WEIGHING APPARATUS
Maxwell Lanning, 1502 Woodcrest,
Houston, Tex. 77018
Filed Feb. 13, 1968, Ser. No. 705,073
Int. Cl. G01g 19/52
U.S. Cl. 177—144                    4 Claims

ABSTRACT OF THE DISCLOSURE

According to the invention, a reusable liquid storage vessel of the type normally used to store liquids under pressure has a self-contained weighing apparatus located in its interior above the liquid in the vessel in order that the liquid may be dispensed from the vessel in accurately weighed amounts.

BACKGROUND OF THE INVENTION

Field of the invention

This invention relates to the accurate vending of liquid from a vessel having an internal self-contained weighing apparatus. It relates particularly to the dispensing of a refrigerant under pressure, such as Freon, into refrigerating equipment requiring a specific volume or weight of refrigerant for proper operation.

Prior art

Various methods have been employed to dispense given amounts of refrigerant. In the service shop the usual equipment for weighing the refrigerant is a separate piece of apparatus that must be charged from a refrigerant container. The refrigerant must be held in a liquid state while charging this weighing apparatus in order that a correct volume in liquid pounds and ounces will be issued. Since a liquid refrigerant turns to gas upon relief from the pressure required to hold it in a liquid state, the charging of this weighing apparatus is difficult and time consuming. The liquid is then dispensed from the weighing apparatus into the refrigerating unit. In the field, servicemen usually depend upon a small scale, such as a bathroom scale, to weigh out the liquid required. The container is placed on the scale and the proper weight of refrigerant is drawn off by reference to the scale. This method is totally unsatisfactory, due to the inaccuracy of the type of scales used and to the necessity of handling two separate pieces of equipment. Our modern refrigerating systems demand small accurate amounts of refrigerant, as for example a unit may specify 2 lbs. 4 oz., the bathroom scale cannot be used for this type of accuracy. More often than not the scale is forgotten or neglected, too, the service hoses connected to the vessel also tend to upset the scale reading.

SUMMARY OF THE INVENTION

An object of the invention is to provide an improved vessel with a self contained weighing apparatus integral with it.

A particular object of the invention is to provide such a vessel in the size required to hold about 20 to 50 pounds of refrigerant under pressure. This is the conveniently carried size in current use.

A further object object of the invention is to provide adjustment means for properly setting the weighing apparatus at a zero reading when the vessel is empty.

Another object of the invention is to provide a convenient means of setting the read-out portion of the scale so as to be able to dispense small accurate amounts of refrigerant from the weighing apparatus while it is still partially full.

Another object of the invention is to provide a reusable vessel of the type described.

In accordance with the present invention a storage vessel of the usual size and shape has been assembled with a weighing apparatus attached within its upper portion. Part of the weighing apparatus is accessable through a valve stem opening in order that the scale may be zeroed in. The scale is readily removable for exchange or repair. The vessel is permanently sealed and is adapted for recharging.

DESCRIPTION OF THE DRAWINGS

In the accompanying drawings,
FIG. I is an overall view of a vessel of the type described.
FIG. II is a vertical cross section through the upper portion of the vessel.
FIG. III is a plan view of the scale readout.

DESCRIPTION OF THE PREFERRED EMBODIMENT

Referring to the accompanying drawings which form a part of this disclosure, a pressure vessel 10 is shown. The vessel 10 may be made by welding (or by a flanged ring secured by bolts) a lower body portion 11 to an upper body portion 12. The lower body portion 11 may have legs 13 or other suitable means to support it in an upright position.

At the top of the upper body portion 12 of vessel 10 an internally threaded neck 14 is centrally disposed. The neck 14 receives the lower threaded body portion of a shut off valve 15. The valve 15 comprises a valve seat 16 against which a valve stem 17 having a ground conical surface 18 at its lower end seats to shut off the valve.

The valve stem 17 is threadedly received in an upper cap member 20. Cap 20 also serves to expand a packer element 21 about the stem in a conventional manner. The valve stem 17, the cap member 20 and the packer element 21 are all easily removed to provide access to the central opening 22 of the valve body 15.

Secured within the body 15 and below the centrally disposed opening 22 is a vertical stem 23. Stem 23 has a socket 24 adapted to receive an Allen wrench (not shown). The socket 24 is smaller than the opening 22 to permit passage of the wrench. By this means the stem 23 may be rotated.

Stem 23 supports a generally inverted conically shaped container 25. Container 25 is the receiving chamber of the self contained weighing apparatus. Container 25 has a liquid reservoir area 26 defined by the conical sides 27, 28 and a top 29. The reservoir area 26 has a sump well 30 disposed at the apex of its inverted conical side walls. The lower portion of stem 23 resides within a bushing 31 within the well 30. Stem 23 is guided by the bushing 31 which permits vertical travel of the container 25 on the stem 23. This vertical travel is limited in an upward direction by the shoulder 33 formed on the stem 23. The pan 29 of the reservoir also helps support the container 25 by another bushing 34 guiding the stem 23. These two bushings 31 and 34 serve to eliminate side sway and prevent the container 25 from contacting the wall of vessel 10.

The container 25 is supported on stem 23 by a spring 35. Spring 35 is confined between a support member 36 on stem 23 and the underside of pan 29. Spring 35 raises container 25 up when it is empty and is compressed to lower container 25 when it is full. The amount of this vertical travel is a function of the quantity of liquid within the reservoir 26 and is transmitted to the read out device generally shown at 37.

The reservoir area 26 has three or more equally spaced vents 38 disposed about the inner periphery of wall 28 and in communication with the area above the top of wall 28. Wall 28 also defines another area 39 in the upper part of container 25 having as its bottom the pan 29.

Even with the top of pan 29 and equally spaced about the inner periphery of wall 28 are a number of orifice ports 40. Ports 40 permit the slow escape of liquid from the area 39. Liquid within area 39 would find ready access to reservoir 26 through the large openings 41 in pan 29. Openings 41 may have one way check flaps 42 on their underside to prevent surging liquid within the reservoir 26 from re-entering area 39. When the reservoir 26 is full, any liquid remaining in area 39 would of course drain out of ports 40.

When the container 25 and the read-out portion 37 of the weighing apparatus is first installed in vessel 10 the stem 23 may be rotated to vary the tension of spring 35. If the tension of spring 35 is altered, the corresponding movement of the container 25 will register on the read-out device 37. In this manner the weighing apparatus may be set to read zero on the scale when empty.

The read-out device 37 comprises a spring loaded arm 43 urged in the direction of arrow 44.

Arm 43 has a roller 45 at its end. The roller 45 bears against the pan 29 and is urged to follow the vertical movement of said pan while rotating about a pivot 49. Arm 43 has a bent down dog 46, which will contact the side 47 of supporting member 48 before the arm has reached dead center. This assures that the roller will always be headed toward the center of pan 29 when the device 37 is installed. Arm 43 transmits its rotation about pin 49 to shaft 50 through gears 51 and 52. Shaft 50 rotates the magnet 53 in direct response to the quantity of liquid in container 25.

The magnet 53 is disposed within a recess 54 formed by non-magnetic metal member 48. Recess 54 has an upper non-magnetic metal plate 55 dividing the pressure area of vessel 10 from the outside atmospheric pressure. No complicated seals are required to achieve this pressure gap, the plate 55 being simply sandwiched between the stacked walls as shown. Above plate 55 and disposed within recess 56 formed by non-magnetic metal members of device 37 is follower magnet 57. Movement of magnet 53 by shaft 50 is reflected by a corresponding movement of follower magnet 57 which in turn rotates shaft 58 having indicator 59 secured thereto. Indicator 59 rides over the stationary dial 60. Dial 60 indicates only one position; empty. Dial 61 arranged above and outside of indicator 59 is calibrated to the full volume of reservoir 26, which may be in pounds and ounces, such as the five pounds shown. Dial 61 is conveniently rotated by the operator to position its zero point at the indicator pointer before dispensing any liquid. Thus, if the container were aproximately three quarters full the indicator would be pointing as shown in FIGURE 3 and the zero-five position of dial 61 would be placed opposite of it. As the liquid within reservoir 26 is dispensed the indicator would rotate counter clockwise and would read the exact amount taken out on the dial 61.

When the reservoir 26 has been emptied the vessel 10 is momentarily inverted to refill it.

I claim:

1. A pressure vessel for the storage of liquid refrigerant, having a self-contained weighing apparatus comprising an internally disposed container, spring supported and guided upon an adjustable tube and a read-out apparatus with an adjustable scale co-acting with said container, so that the liquid within said vessel may be transferred to said container to dispense a given quantity from said vessel.

2. The apparatus of claim 1 wherein said internally disposed container has a horizontal wall to divide the interior into a lower reservoir area and an upper liquid accumulating area communicating with the reservoir area via one way check valves.

3. The apparatus of claim 1 wherein said read out apparatus comprises a spring loaded pivotedly mounted follower arm with a roller at one end and a circular gear at the other end, in order that movement of said arm will be transmitted to a geared shaft to rotate a first magnet all disposed in the high pressure side of said pressure vessel and a second magnet adjacent said first magnet adapted to follow said first magnet in order to rotate an indicator positioned between a stationary dial and an adjustable dial all located on the low pressure side of said pressure vessel.

4. The combination of the apparatus of claim 2 wherein said read-out apparatus comprises a spring loaded pivotedly mounted follower arm with a roller at one end and a circular gear at the other end, in order that movement of said arm will be transmitted to a geared shaft to rotate a first magnet all disposed in the high pressure side of said pressure vessel and a second magnet adjacent said first magnet adapted to follow said first magnet in order to rotate an indicator positioned between a stationary dial and an adjustable dial all located on the low pressure side of said pressure vessel.

References Cited

UNITED STATES PATENTS

| 830,308 | 9/1906 | Dietz | 117—245 X |
| 1,245,076 | 10/1917 | Webb | 177—245 X |

RICHARD B. WILKINSON, Primary Examiner

GEORGE H. MILLER, JR., Assistant Examiner

U.S. Cl. X.R.

177—165, 225, 245; 222—23